(12) United States Patent
Busch et al.

(10) Patent No.: US 12,514,791 B2
(45) Date of Patent: Jan. 6, 2026

(54) AESTHETIC DENTAL FILLING MATERIAL HAVING HIGH CURING DEPTH

(71) Applicant: Ivoclar Vivadent AG, Schaan (LI)

(72) Inventors: Susanne Busch, Frastanz (AT); Benjamin Gebhardt, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 763 days.

(21) Appl. No.: 17/758,833

(22) PCT Filed: Jan. 25, 2021

(86) PCT No.: PCT/EP2021/051557
§ 371 (c)(1),
(2) Date: Jul. 14, 2022

(87) PCT Pub. No.: WO2021/148667
PCT Pub. Date: Jul. 29, 2021

(65) Prior Publication Data
US 2023/0059534 A1     Feb. 23, 2023

(30) Foreign Application Priority Data

Jan. 24, 2020  (EP) .................................. 20153683

(51) Int. Cl.
*A61K 6/71*   (2020.01)
*A61K 6/17*   (2020.01)
*A61K 6/62*   (2020.01)
*A61K 6/818*  (2020.01)
*A61K 6/887*  (2020.01)
*A61K 6/893*  (2020.01)

(52) U.S. Cl.
CPC .................. *A61K 6/71* (2020.01); *A61K 6/17* (2020.01); *A61K 6/62* (2020.01); *A61K 6/818* (2020.01); *A61K 6/887* (2020.01); *A61K 6/893* (2020.01)

(58) Field of Classification Search
CPC ................................ A61K 6/887; C08L 33/10
See application file for complete search history.

(56) References Cited

U.S. PATENT DOCUMENTS

| | | | |
|---|---|---|---|
| 4,291,047 A | 9/1981 | Kranz et al. |
| 4,447,520 A | 5/1984 | Henne et al. |
| 4,629,746 A | 12/1986 | Michl et al. |
| 4,737,593 A | 4/1988 | Ellrich et al. |
| 5,534,559 A | 7/1996 | Leppard et al. |
| 8,617,306 B2 | 12/2013 | Lambert et al. |
| 9,833,388 B2 | 12/2017 | Willner et al. |
| 2002/0152930 A1 | 10/2002 | Neubert et al. |

(Continued)

FOREIGN PATENT DOCUMENTS

WO   2017/149242 A1   9/2017

OTHER PUBLICATIONS

Moszner, N., et al., New Diluents for Dental Composites, Macromolecular Materials and Engineering, Apr. 25, 2016, vol. 301, No. 6, pp. 750-759.

*Primary Examiner* — Peter A Salamon
(74) *Attorney, Agent, or Firm* — Ann M. Knab; Thad McMurray

(57) ABSTRACT

Dental material, which contains at least one radically polymerizable monomer, at least one radiopaque filler, at least one composite filler, at least one inorganic filler and at least one initiator for the radical polymerization. The dental material is particularly suitable as dental filling material.

18 Claims, 3 Drawing Sheets

(56) References Cited

U.S. PATENT DOCUMENTS

| | | |
|---|---|---|
| 2008/0076847 A1 | 3/2008 | Moszner et al. |
| 2010/0035214 A1 | 2/2010 | Reynaud et al. |
| 2017/0172855 A1 | 6/2017 | Moszner et al. |
| 2017/0224591 A1* | 8/2017 | Vogel .................. A61K 6/78 |
| 2019/0192386 A1 | 6/2019 | Fukudome et al. |

* cited by examiner

AESTHETIC DENTAL FILLING MATERIAL HAVING HIGH CURING DEPTH

CROSS-REFERENCE TO RELATED APPLICATIONS

This application is a National Stage application of International patent application No. PCT/EP2021/051557 filed on Jan. 25, 2021, which claims priority to European patent application No. 20153683.6 filed on Jan. 24, 2020, all the disclosures of which are incorporated herein by reference in their entirety.

FIELD OF THE INVENTION

The present invention relates to radiopaque dental materials, which are characterized by a large depth of cure and allow the simplified production of aesthetically appealing dental restorations. The materials are suitable in particular as dental filling materials.

BACKGROUND

The dental market offers an almost endless number of filling materials for every conceivable indication in filling treatment. Developments in the field of methacrylate-based filling materials have now reached such a high level that a professionally restored tooth can practically no longer be distinguished from its natural counterpart. This makes it difficult to differentiate between the restoration and the natural tooth substance, which, in particular in terms of later treatments, is disadvantageous. The need therefore exists for dental materials which in addition to high aesthetics have a high radiopacity and which thus enable a clear distinction from the natural tooth substance.

The production of aesthetically appealing restorations is associated with great effort for the dentist. Currently, two to four different substances are generally used for an aesthetic filling in order to imitate the natural appearance of the lost hard dental tissue as naturally as possible. In order to reproduce the diversity of natural tooth colours, colour palettes with 30 and more different shades in various opacities are offered, from which the optimal material combination for the respective treatment case must be selected. It would be desirable to have materials available which enable the production of aesthetically appealing restorations with a lower material cost.

Dental filling materials based on methacrylate are often referred to as plastic fillings or more correctly as composites. Composite materials contain a polymerizable organic matrix and fillers as well as various additives, such as stabilizers, initiators and pigments. The filler content depends to a significant degree on the desired intended use and can be up to 90 wt.-%.

The polymerizable organic matrix of dental filling composites and adhesives is based mostly on a mixture of dimethacrylates, which mostly contain the highly viscous bis-GMA as crosslinker. Bis-GMA results in good mechanical properties with comparatively little shrinkage. However, commercially available bis-GMA often contains bisphenol A as an impurity. Further examples of frequently used dimethacrylates are urethane dimethacrylates and the low-viscosity dimethacrylates regularly used as diluting monomers, bis(methacryloyloxymethyl)-tricyclo[5.2.1]decane (TCDMA), decanediol-1,10-dimethacrylate ($D_3MA$) and triethylene glycol dimethacrylate (TEGDMA).

As a rule, the materials contain an initiator for the radical polymerization, wherein nowadays light-curing materials which contain a photoinitiator are assuming a dominant position in filling treatment. A disadvantage of light-curing materials is that the placing in particular of large fillings is time-consuming because the light required for the curing can only penetrate into the materials up to a limited depth. In the so-called incremental technique, the filling is therefore built up in layers from the composite material, wherein the layers have a thickness in each case of approx. 2 mm and must be cured individually.

So-called bulk-fill materials, which allow depths of cure of approx. 4 mm per layer, overcome this disadvantage. However, these materials often do not have the desired aesthetic properties and are therefore not suitable or suitable only to a limited extent for the restoration of anterior teeth. The depth of cure correlates to the translucence of the materials, wherein a high translucence and a good depth of cure are achieved when the organic matrix and the fillers used have corresponding refractive indices. A disadvantage here is that, because of their high translucence, such composites only poorly cover the dentin lying underneath, which is troublesome for aesthetic reasons because the colour of the dentin differs from that of the visible dental enamel.

WO 2016/026915 A1 discloses radically polymerizable dental materials which combine a high depth of cure with good aesthetic properties. The materials are characterized in that the monomer mixture used for their preparation has a refractive index no of from 1.50 to 1.70 and in that the refractive index of the monomer mixture before the curing corresponds to the refractive index of the filler or is at most 0.013 greater, but after the curing is at least 0.02 greater than the refractive index of the filler. Before the polymerization the dental materials have a high translucence and thus a large depth of cure. The translucence decreases during polymerization. The materials can contain radiopaque fillers such as e.g. radiopaque glasses or ytterbium fluoride with a particle size of from 0.050 to 2.0 μm. The materials are suitable as bulk-fill materials, but are not packable because of their flowability.

U.S. Pat. No. 4,629,746 discloses microfilled dental materials, which contain rare earth metal fluorides such as ytterbium trifluoride with a primary particle size of from 5 to 700 nm, preferably 50 to 300 nm as radiopaque fillers. In addition to the radiopaque fillers, the materials can contain non-radiopaque fillers such as precipitated or pyrogenic silicas. The materials are to have a high radiopacity and a good transmittance.

EP 1 234 567 A2 discloses prepolymers with defined particle size distribution, which contain only a small proportion of fine-grained particles with a size of less than 10 μm. These fillers are to yield polymerizable compositions with low polymerization shrinkage and good polishability, surface smoothness and abrasion resistance. To increase the radiopacity, the prepolymers can contain radiopaque fillers such as ytterbium trifluoride with a particle size of 300 nm.

WO 2017/149242 A1 discloses the preparation of colloidal suspensions of ytterbium fluoride with a particle size of less than 100 nm and the use thereof for the preparation of dental materials.

U.S. Pat. No. 9,833,388 B2 discloses dental materials which contain ytterbium fluoride with a particle size between 25 and 120 nm. These are said to show a low number of artefacts in the case of digital volume tomography.

In addition to the absolute shrinkage of a composite, an increasingly large importance is attributed to the shrinkage force. In the radical polymerization of dental composites, the polymerization shrinkage ($\Delta V_P$) of the monomers used results in a contraction in volume, which can lead to a very disadvantageous formation of marginal gaps in the case of filling composites. In the polymerization of monofunctional methacrylates, the shrinkage during the polymerization does not lead to the build-up of a polymerization shrinkage stress (PSS) because the reduction in the volume can be compensated for by flow of the macromolecules formed. In the case of the crosslinking polymerization of multifunctional methacrylates, however, already within a few seconds a three-dimensional polymer network forms which prevents a viscous flow, with the result that a considerable PSS builds up.

EP 2 965 741 A1 discloses the use of radically polymerizable sulfur-containing monomers such as 2-(toluene-4-sulfonylmethyl)acrylic acid lauryl ester as chain regulator for reducing the PSS in dental materials.

SUMMARY

The object of the invention is to provide dental materials which do not have the above-named disadvantages and which have a high radiopacity, with the result that they can be distinguished well from the natural tooth substance. Moreover, the materials are to enable a simplified production of aesthetically appealing restorations and be particularly suitable as dental filling materials.

This object is achieved according to the invention by dental materials which contain
(a) at least one radically polymerizable monomer,
(b) at least one radiopaque filler,
(c) at least one inorganic filler,
(d) at least one composite filler and
(e) at least one initiator for the radical polymerization.

The particles of the composite filler (d) preferably have a spherical shape.

It was found that dental materials which meet the above requirements can be prepared through a targeted selection of substances known per se.

Radically polymerizable polyfunctional monomers, and in particular (meth)acrylamides and (meth)acrylates, are preferred as monomer (a). Polyfunctional, and in particular difunctional, methacrylates as well as polyfunctional, and in particular difunctional, hybrid monomers are particularly preferred. Hybrid monomers are monomers which contain both (meth)acrylamide and (meth)acrylate groups. By polyfunctional monomers is meant compounds with two or more, preferably 2 to 4, and in particular 2, radically polymerizable groups.

According to a preferred embodiment, the materials according to the invention contain no monofunctional monomers. By monofunctional monomers is meant compounds with one radically polymerizable group. Materials which contain exclusively polyfunctional, and in particular difunctional, methacrylates as component (a) are preferred.

A single monomer or preferably a monomer mixture can be used as component (a). According to the invention, monomers and monomer mixtures are preferred which show a large change in refractive index during the polymerization. The monomer component (a) preferably has a refractive index of from 1.495 to 1.520, particularly preferably from 1.505 to 1.515. The refractive index of the monomer mixture is preferably set such that before the curing it corresponds to the refractive index of the filler (c) or at most lies 0.03 above it. The refractive index of the monomer or of the monomer mixture is preferably 0.002 to 0.02, particularly preferably 0.005 to 0.015, greater than the refractive index of filler (c). The refractive index of component (a) can be set by mixing monomers with different refractive indices.

Before the polymerization the dental materials according to the invention have a high translucence because the refractive indices of monomer and filler only differ from each other a little. The light used for the polymerization can therefore penetrate deep into the materials, which guarantees a large depth of cure. During the polymerization, the refractive index of the monomers increases, while the refractive index of the filler or fillers remains unchanged. The difference between the refractive indices of monomer and filler thereby increases, and the translucence correspondingly decreases. This is advantageous for aesthetic reasons because layers of the tooth with a different coloration lying deeper can be better covered.

The monomers used as component (a) are preferably selected such that the difference in refractive index between the unpolymerized and the polymerized state is at least 0.015, preferably at least 0.02. According to a particularly preferred embodiment, the difference in refractive index is 0.015 to 0.04, particularly preferably from 0.021 to 0.035 and quite particularly preferably from 0.025 to 0.030.

Monomers particularly preferred according to the invention are: 1,6-bis-[2-methacryloyloxyethoxycarbonylamino]-2,2,4-trimethylhexane (RM3; an addition product of 2-hydroxyethyl methacrylate and 2,2,4-trimethyl hexamethylene diisocyanate), N-(2-methacryloyloxyethyl)carbamic acid-(2-methacryloyloxyethyl)ester (V837; CAS No.: 139096-43-8), tetramethyl xylylene diurethane dimethacrylate (V380), bisphenol A dimethacrylate, 2,2-bis[4-(2-hydroxy-3-methacryloyloxypropyl)phenyl]propane (bis-GMA), ethoxylated or propoxylated bisphenol A dimethacrylate, such as e.g. the bisphenol A dimethacrylate 2-[4-(2-methacryloyloxyethoxyethoxy)phenyl]-2-[4-(2-methacryloyloxyethoxy)phenyl]-propane) (SR-348c; contains 3 ethoxy groups), 2,2-bis[4-(2-methacryloxypropoxy)phenyl]propane, 2-{[(2-(N-methylacrylamido)-ethoxy)-carbonyl]-amino}-ethyl methacrylate (V850, CAS Number: 2004672-68-6), bis-(3-methacryloyloxymethyl)tricyclo-[5.2.1.0$^{2,6}$] decane (TCP), 1,10-decanediol dimethacrylate (D$_3$MA), 2-([1,1'-biphenyl]-2-oxy)ethyl methacrylate, and mixtures thereof.

The dental materials according to the invention preferably contain a mixture of different monomers as monomer component (a). According to a particularly preferred embodiment, the component (a) contains one or more monomers from the group of the urethane di(meth)acrylates, in particular the urethane dimethacrylates.

Monomers with aromatic groups are preferred as urethane dimethacrylates, in particular the urethane di(meth)acrylate derivatives of 1,3-bis(1-isocyanato-1-methylethyl)benzene described in EP 0 934 926 A1, tetramethyl xylylene diurethane di(meth)acrylate (V380) is particularly preferred:

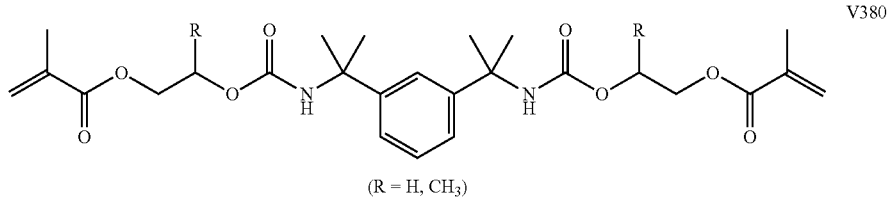

V380

(R = H, CH₃)

In the formula shown, the radicals R are, independently of each other, H or CH₃, wherein the radicals can have the same meaning or different meanings. A mixture is preferably used which contains molecules in which both radicals are H, molecules in which both radicals are CH₃, and molecules in which one radical is H and the other radical is CH₃. Such a mixture can be obtained, for example, by reacting 1,3-bis (1-isocyanato-1-methylethyl)benzene with hydroxypropyl methacrylate and 2-hydroxyethyl methacrylate. Tetramethyl xylylene diurethane dimethacrylate (R=CH₃) is quite particularly preferred.

Urethane dimethacrylate monomers with aromatic groups are preferably used in a total amount of from 5 to 60 wt.-%, particularly preferably from 10 to 45 wt.-% and quite particularly preferably 10 to 25 wt.-%, based on the mass of the monomer component (a).

The compositions according to the invention can furthermore contain one or more hybrid monomers. Preferred monomers of this type are the hybrid monomers disclosed in EP 3 064 192 A1, wherein monomers with methacrylamide and methacrylate groups are particularly preferred. Hybrid monomers which additionally have a urethane group are quite particularly preferred.

According to the invention, those dental materials are particularly preferred which contain at least urethane di(meth)acrylate monomer and/or hybrid monomer of the general formula 1:

Formula 1

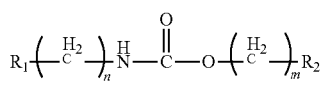

where
R¹, R²=independently of each other in each case H₂C=C(—R³)—C(=O)—O— or H₂C=C(-R⁴)—C(=O)—NR⁵—;
R³=H or CH₃, preferably CH₃;
R⁴=H or CH₃, preferably H;
R⁵=H or CH₃, preferably CH₃;
n, m=independently of each other in each case a whole number from 1 to 4, preferably 1 to 2, and particularly preferably 2.

Monomers of Formula 1 are also referred to in the following as difunctional urethanes.

Difunctional urethanes of Formula 1 which have a refractive index of from 1.450 to 1.510, particularly preferably from 1.460 to 1.505, and quite particularly preferably from 1.460 to 1.500 are preferred.

Particularly preferred difunctional urethanes of Formula 1 are 2-{[(2-(N-methylacrylamido)-ethoxy)-carbonyl]-amino}-ethyl methacrylate (V850, CAS Number: 2004672-68-6) and in particular N-(2-methacryloyloxyethyl)carbamic acid-(2-methacryloyloxyethyl)ester (V837, CAS No.: 139096-43-8):

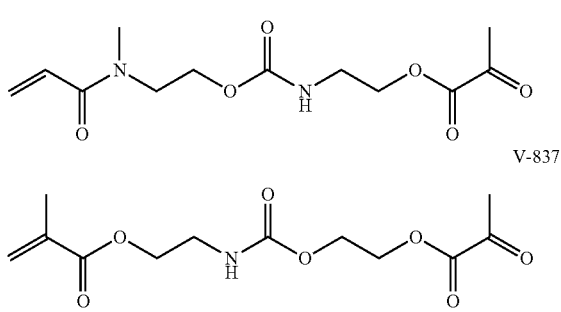

Urethanes of Formula 1 are characterized in that they show a significant increase in refractive index during the polymerization. For example, the refractive index of V850 changes from 1.500 before to 1.537 after the polymerization and that of V837 changes from 1.476 before to 1.518 after the polymerization. Urethanes of Formula 1 are thus optimally suited for intensifying the change in refractive index of the monomer mixture. V850 is additionally characterized by a very low toxicity (cytotoxicity: XTT₅₀=1085.6 µg/mL (L929 mouse cell line); Ames Test: negative (*Salmonella typhimurium* strains TA 1535, TA 1537, TA 98, TA 100 and *Escherichia coli* WP2 uvrA)).

Difunctional urethanes according to Formula 1 are preferably used in a total amount of from 3 to 30 wt.-%, particularly preferably from 5 to 25 wt.-% and quite particularly preferably from 6 to 20 wt.-%, based on the mass of the monomer component (a).

In addition to the urethane di(meth)acrylates and difunctional urethanes of Formula 1 already named, the dental materials according to the invention can advantageously contain further urethane di(meth)acrylates, preferably urethane dimethacrylates. These are preferably used in an amount of from 10 to 70 wt.-%, particularly preferably 15 to 60 wt.-%, and quite particularly preferably 20 to 47 wt.-%, based on the mass of the monomer component (a). A preferred urethane dimethacrylate is 7,7(9)9-trimethyl-4,3-dioxo-3,14-dioxa-5,12-diazohexadecane-1,16-diyl dimethacrylate (RM3).

The total amount of urethane di(meth)acrylates and difunctional urethanes of Formula 1 is preferably in the range of from 20 to 80 wt.-%, preferably 30 to 70 wt.-%, and particularly preferably 40 to 67 wt.-%, based on the mass of the monomer component (a).

In addition to the named monomers, the monomer component (a) can preferably also contain one or more radically polymerizable bisphenol A derivatives, for example 2,2-bis [4-(2-hydroxy-3-methacryloyloxypropyl)phenyl]propane (bis-GMA), preferably bisphenol A dimethacrylate, particularly preferably ethoxylated or propoxylated bisphenol A dimethacrylate, and quite particularly preferably 2-[4-(2- methacryloyloxyethoxyethoxy)phenyl]-2-[4-(2-methacryloyloxyethoxy)phenyl]-propane) (SR-348c, contains 3 ethoxy groups). Bis-GMA is an addition product of methacrylic acid and bisphenol A diglycidyl ether. Since commercially obtainable bis-GMA is frequently contaminated with bisphenol A, according to the invention materials which contain no bis-GMA are preferred.

The bisphenol A derivative(s) is/are preferably used in a total amount of from 10 to 40 wt.-%, particularly preferably from 12 to 30 wt.-%, and quite particularly preferably 14 to 25 wt.-%, based on the mass of the monomer component (a).

The component (a) can advantageously furthermore contain methacrylates from the group of the tricyclic dimethacrylates, in particular tricyclodecane dimethanol dimethacrylates, and quite particularly preferably the tricyclodecane dimethanol dimethacrylate TCP (CAS Number: 42594-17-2). The refractive index of TCP changes during polymerization from 1.501 to 1.531. Tricyclic dimethacrylates are preferably used in a total amount of from 1 to 40 wt.-%, particularly preferably from 5 to 30 wt.-%, and quite particularly preferably 10 to 25 wt.-%, based on the mass of the monomer component (a).

In addition to the named monomers, the monomer component (a) can advantageously also contain one or more so-called chain regulators. These are monomers which control chain growth during the polymerization. A reduction in the shrinkage force is hereby achieved. A chain regulator particularly preferred according to the invention is 2-[(1-ethoxy-2-methyl-1-oxopropan-2-yl)oxy]acrylic acid ethyl ester. Furthermore, the radically polymerizable, sulfur-containing monomers disclosed in EP 2 965 741 A1 are preferred, 2-(toluene-4-sulfonylmethyl)-acrylic acid ethyl ester is particularly preferred. Chain regulators are preferably used in an amount of from 0 to 8 wt.-%, particularly preferably from 0.1 to 7 wt.-%, and quite particularly preferably from 0.5 to 6 wt.-%, based on the mass of the monomer component (a). A low shrinkage force has an advantageous effect on the marginal seal of fillings.

Finally, the monomer component (a) can contain one or more further radically polymerizable monomers, which fall into none of the above-named groups, for example for setting the refractive index. Preferred further monomers are (meth)acrylamides, e.g. N-disubstituted (meth)acrylamides, such as N,N'-dimethylacrylamide, as well as bis(meth)acrylamides, such as N,N-diethyl-1,3-bis(acrylamido)-propane, 1,3-bis(methacrylamido)-propane, 1,4-bis(acrylamido)-butane and 1,4-bis(acryloyl)piperazine. Monofunctional methacrylates, such as 2 ([1,1'-biphenyl]-2-oxy)ethyl methacrylate, are further preferred, and polyfunctional and in particular difunctional methacrylates are particularly preferred, such as di-, tri- or tetraethylene glycol dimethacrylate, trimethylolpropane trimethacrylate, pentaerythritol tetramethacrylate, as well as glycerol dimethacrylate and glycerol trimethacrylate, 1,4-butanediol dimethacrylate, 1,10-decanediol dimethacrylate ($D_3MA$), 1,12-dodecanediol dimethacrylate, and mixtures thereof.

The monomer 1,10-decanediol dimethacrylate ($D_3MA$) is particularly preferred. It is characterized by a large difference in refractive index between the monomer and polymer forms (1.460 to 1.500). Moreover, it has a very low refractive index and is therefore particularly suitable for setting a low refractive index of the monomer component (a).

Such further monomers are preferably used in a total amount of from at most 20 wt.-%, particularly preferably 2 to 20 wt.-%, and quite particularly preferably from 4 to 10 wt.-%, based on the mass of the monomer component (a).

The total amount of radically polymerizable monomers preferably lies in a range of from 5 to 40 wt.-%, particularly preferably 10 to 35 wt.-%, quite particularly preferably 12 to 30 wt.-%, based on the total mass of the dental material.

According to the invention, dental materials in which the component (a) contains a mixture of the following monomers are particularly preferred:

(a-1) 20 to 80 wt.-%, preferably 30 to 70 wt.-%, and quite particularly preferably 40 to 67 wt.-% of at least one urethane dimethacrylate, (a-2) 10 to 40 wt.-%, preferably 12 to 30 wt.-%, and quite particularly preferably 14 to 25 wt.-% of at least one bisphenol A derivative, preferably an ethoxylated or propoxylated bisphenol A dimethacrylate, quite particularly preferably SR-348c, (a-3) optionally up to 40 wt.-%, preferably 5 to 30 wt.-%, and quite particularly preferably 10 to 25 wt.-% of at least one tricyclic dimethacrylate, preferably tricyclodecane dimethanol dimethacrylate (TCP), and (a-4) optionally up to 20 wt.-%, preferably 4 to 20 wt.-%, and particularly preferably 4 to 10 wt.-% other monomers, i.e. monomers which do not fall into one of the groups (a-1) to (a-3) and (a-5), preferably $D_3MA$, (a-5) optionally up to 8 wt.-%, preferably 0.1 to 7 wt.-%, and particularly preferably 0.5 to 6 wt.-% of at least one chain regulator, in each case based on the total mass of the component (a).

In all cases, individual monomers or a mixture of several monomers can be used as components (a-1) to (a-5).

The monomers (a-1) to (a-5) are preferably selected from the substances defined above, wherein those dental materials in which the component (a) contains exclusively the named monomers are particularly preferred according to the invention.

As component (a-1), a monomer mixture is preferably used which contains 5 to 60 wt.-%, preferably from 10 to 45 wt.-%, and particularly preferably 10 to 25 wt.-% of at least one urethane dimethacrylate monomer with aromatic groups, preferably V380, from 3 to 30 wt.-%, particularly preferably from 5 to 25 wt.-%, and quite particularly preferably from 6 to 20 wt.-% of at least one difunctional urethane of Formula 1, 10 to 70 wt.-%, preferably 15 to 60 wt.-%, and particularly preferably 20 to 47 wt.-% of at least one further urethane dimethacrylate, preferably U DMA, in each case based on the total mass of the monomer component (a).

Radiopaque Fillers (b)

The materials according to the invention contain, as component (b), at least one radiopaque filler, preferably tantalum(V) oxide, barium sulfate, a mixed oxide of $SiO_2$ with ytterbium(III) oxide or tantalum(V) oxide, ytterbium trifluoride, or a mixture thereof, wherein ytterbium trifluoride is particularly preferred.

The radiopaque filler(s) is/are present in particulate form and preferably have an average primary particle size of ≤25 nm, particularly preferably of 10 to 24 nm, wherein the particles are present in non-aggregated and non-agglomerated form. Particles with a particle size of ≤25 nm are referred to here as nanoscale.

The materials according to the invention quite particularly preferably contain $YbF_3$ particles with an average primary particle size of ≤25 nm, preferably of 10 to 24 nm, particularly preferably of 14 to 22 nm and in particular approx. 20 nm, wherein the particles are preferably present in non-aggregated and non-agglomerated form.

Unless otherwise indicated, all particle sizes are volume-averaged particle sizes (D50 values, i.e. 50% of the particles are smaller than the value stated). The particle size determination in the range of from 0.1 µm to 1000 µm is preferably effected by means of static light scattering (SLS), for example using an LA-960 static Laser Scattering Particle Size Distribution Analyzer (Horiba, Japan) or using a Microtrac S100 Particle Size Analyzer (Microtrac, USA). Here, a laser diode with a wavelength of 655 nm and an LED with a wavelength of 405 nm are used as light sources. The use of two light sources with different wavelengths makes it possible to measure the entire particle size distribution of a specimen in only one measurement pass, wherein the measurement is carried out as a wet measurement. For this purpose, an aqueous dispersion of the filler is prepared and the scattered light thereof is measured in a flow cell. The scattered light analysis for calculating particle size and particle size distribution is effected in accordance with the Mie theory according to DIN/ISO 13320. The measurement of the particle size in a range of from 5 nm to 0.1 µm is preferably effected by dynamic light scattering (DLS) of aqueous particle dispersions, preferably using a He—Ne laser with a wavelength of 633 nm, at a scattering angle of 90° and at 25° C., e.g. using a Malvern Zetasizer Nano ZS (Malvern Instruments, Malvern, UK).

It was found that $YbF_3$ particles with a size of smaller than 25 nm make it possible to increase the radiopacity of the materials, but have only a small effect on the refractive index of the composition. Unlike radiopaque glasses, they do not therefore require the use of monomers with a high refractive index in order to guarantee a good translucence. By the use of nanoscale $YbF_3$ particles, the use of barium-containing glass as radiopaque filler can be dispensed with. Furthermore, it is advantageous that the nanoscale $YbF_3$ particles do not bring about an appreciable opacification of the pastes.

According to a preferred embodiment, the $YbF_3$ particles are surface-modified. For this purpose, they are preferably treated with an organic compound, which has functional groups which can bind to the surface of the $YbF_3$ particles. Preferred functional groups are phosphate, phosphonate, carboxyl, dithiophosphate and dithiophosphonate groups. The surface modifiers preferably also have radically polymerizable groups, which enable crosslinking with the organic component (a).

Preferred surface modifiers are P-7,10,13,16-tetraoxaheptadec-1-yl-phosphonic acid, P-[6-[2-[2-(2-hydroxyethoxy)ethoxy]ethoxy]hexyl]phosphonic acid, 2,3-di-(methacryloyloxy)-propyl-1-phosphonic acid, 2,3-di-(methacryloyloxy)-propyl-1-bisphosphonic acid and 3-O-benzyloxy-2-methacryloyloxy-propyl-1-bisphosphonic acid.

The dental materials according to the invention preferably contain 1 to 30 wt.-%, particularly preferably 3 to 20 wt.-%, and quite particularly preferably 6 to 12 wt.-% nanoscale $YbF_3$ particles, based on the mass of the dental material.

Inorganic Filler (c)

Preferred inorganic fillers (c) are glass powders, preferably barium-free glass powders, in particular strontium glass powders and/or zirconium-containing glass powders. A quite particularly preferred glass is the glass with the CAS Number 65997-17-3. The glass powders preferably have an average particle size of from 0.1 to 5 µm, particularly preferably 0.3 to 2 µm, and quite particularly preferably 0.4 to 0.9 µm.

Furthermore, glasses with a refractive index below 1.54, particularly preferably below 1.52, and quite particularly preferably below 1.51, are preferred according to the invention. The refractive index of the glasses preferably lies in a range of from 1.49 to 1.54, particularly preferably 1.49 to 1.52, and quite particularly preferably 1.49 to 1.51. Surprisingly, these glasses yield particularly good depths of cure.

Inorganic glasses are preferably used in an amount of from 20 to 80 wt.-%, particularly preferably 25 to 70 wt.-%, and quite particularly preferably from 30 to 60 wt.-%, based on the total mass of the dental material.

Further preferred inorganic fillers (c) are zirconium silicates, for example with a primary particle size of from 2 to 100 nm, preferably 5 to 60 nm, particularly preferably 10 to 40 nm, and quite particularly preferably 20 to 30 nm. The primary particles are spherical and aggregated to form secondary particles with a size 0.5 to 20 µm, preferably 1 to 10 µm, particularly preferably from 1 to 7 µm, and quite particularly preferably 2 to 6 µm. They can be prepared according to U.S. Pat. No. 8,617,306 B2.

The polishability of the compositions according to the invention can be improved through the addition of the zirconium silicate. The refractive index of the zirconium silicates preferably lies in a range of 1.490 to 1.510. Zirconium silicate is preferably used in an amount of from 1 to 30 wt.-%, particularly preferably 3 to 25 wt.-%, and quite particularly preferably 5 to 20 wt.-%, based on the total mass of the dental material.

Moreover, $ZrO_2$ particles, preferably with an average primary particle size of from 0.5 to 50 nm, particularly preferably from 1 to 20 nm, and quite particularly preferably from 2 to 10 nm, are preferred as inorganic fillers.

The radiopacity of the materials can be further increased through the addition of $ZrO_2$ particles. The $ZrO_2$ particles also bring about a significant increase in the refractive index of the materials. In order to compensate for this effect, $ZrO_2$ particles are therefore preferably used in combination with monomers which have a low refractive index. Low-viscosity methacrylate monomers such as TCP, monomers of Formula 1, and in particular $D_3MA$ (RI=1.460) are preferred.

According to a preferred embodiment, the $ZrO_2$ particles are suspended in a low-viscosity monomer. For example, 30 to 50 wt.-% $ZrO_2$ particles can be suspended in $D_3MA$ without a noticeable clouding of the monomer being visible. The refractive index of a suspension in $D_3MA$ which contains 50 wt.-% $ZrO_2$ particles with an average size of 8 nm is 1.524, for example; the refractive index of a 40 wt.-% suspension of particles with an average size of 3 nm is 1.494. Pure $ZrO_2$ has a refractive index of 2.150.

$ZrO_2$ is preferably used in an amount of from 0.3 to 5 wt.-%, particularly preferably 0.4 to 4 wt.-%, and quite particularly preferably 0.5 to 2 wt.-%, based on the total mass of the material.

The total amount of inorganic filler (c) is preferably 20 to 90 wt.-%, particularly preferably 30 to 70 wt.-%, quite particularly preferably 40 to 65 wt.-%, based on the total mass of the dental material.

To achieve a high depth of cure of the dental material according to the invention, the refractive indices of the filler (c) and of the monomer component (a) are preferably matched to each other. The monomer component (a) is preferably set to a refractive index which is identical to the refractive index of the filler (c), or at most 0.03 greater. The refractive index of the monomer component (a) is particularly preferably 0.002 to 0.02, and quite particularly preferably 0.05 to 0.015, greater than the refractive index of the filler (c).

The materials according to the invention can contain a filler or a filler mixture as filler (c). When filler mixtures are used, materials are preferred which contain as component (c) predominantly, i.e. more than 50 wt.-%, particularly preferably more than 80 wt.-%, based on the total mass of component (c), quite particularly preferably exclusively those fillers the refractive index of which lies in the named range.

The refractive index is a substance constant which depends on the wavelength of the light used, on the temperature, on the pressure and the purity of the substance. Unless otherwise indicated, by the refractive index is meant in all cases here the refractive index (no) measured at room temperature with standard illumination D65.

The determination of the refractive index of liquid monomers and monomer mixtures can be effected with a commercially available Abbe refractometer.

The determination of the refractive index (RI) of solid substances, such as e.g. of inorganic fillers or composite fillers, is effected according to the immersion method. The substances are dispersed in mixtures of liquids with different refractive indices (so-called immersion liquids) at room temperature. In the process, the contours of the solid particles appear more clearly the greater the difference in refractive index between liquid and solid is. If the refractive index of the liquid is now altered such that it approaches that of the solid, the particle contours become weaker and disappear completely when the refractive indices match. Liquids with a known refractive index, e.g. mixtures of benzyl salicylate ($n_D^{20}$=1.536) and triacetin ($n_D^{20}$=1.431) or bromonaphthalene ($n_D^{20}$=1.657) are suitable as immersion liquids. By varying the proportions of these substances, the refractive index of the mixture can be matched to that of the solid to be measured. When the refractive indices match, the refractive index of the immersion liquid is determined using a refractometer.

To improve the bond between the filler particles and the polymerization matrix, the fillers are preferably surface-modified, particularly preferably by silanization, quite particularly preferably with radically polymerizable silanes, in particular with 3-methacryloyloxypropyltrimethoxysilane. For the surface modification of non-silicate fillers, e.g. of $ZrO_2$ or $TiO_2$, functionalized acidic phosphates, such as e.g. 10-methacryloyloxydecyl dihydrogen phosphate, can also be used.

Composite Filler (d)

The materials according to the invention contain, as component (d), at least one composite filler. By composite fillers is meant organic polymer particles which are themselves filled with inorganic fillers. Composite fillers with an average particle size of from 5 to 100 µm, particularly preferably 15 to 60 µm, and quite particularly preferably 20 to 40 µm are preferred.

In the case of the composite fillers, the refractive index of the cured polymer matrix is preferably chosen such that it matches the refractive index of the inorganic filler contained therein, or differs from it by at most ±0.2, preferably at most ±0.1, and particularly preferably at most ±0.01, with the result that the particles of the composite filler have a high translucence. If more than one inorganic filler is used for the preparation of the composite filler, the majority of the inorganic fillers, i.e. more than 50 wt.-%, particularly preferably more than 80 wt.-%, based on the mass of the inorganic fillers, preferably has a refractive index in the named range.

The composite fillers are preferably prepared by curing composite pastes which contain one or more radically polymerizable monomers and one or more inorganic fillers.

For the preparation of the composite fillers, the monomers named as component (a), the fillers named as components (b) and (c), and the initiators named as component (e) are preferred. Such mixtures of components (a), (b), (c) and (e) for the preparation of composite fillers are likewise a subject of the invention.

Particularly preferred radically polymerizable monomers for the preparation of the composite fillers are di(meth) acrylates, quite particularly preferably glycerol dimethacrylate (GDMA, RI=1.477), alkylene dimethacrylates, such as e.g. 1,10-decanediol dimethacrylate ($D_3MA$, RI=1.460) and triethylene glycol dimethacrylate (TEGDMA, RI=1.461), as well as urethane dimethacrylates, such as RM3 and V837, and in particular urethane dimethacrylates with aromatic groups, particularly preferably V380, and mixtures thereof.

1,10-Decanediol dimethacrylate is characterized by a particularly low refractive index (RI). The urethane dimethacrylate RM3, with a refractive index of 1.485, is also among the monomers with a low refractive index. With a refractive index of 1.513, V380 has a significantly lower refractive index than bis-GMA with 1.552, but has its good mechanical effect on the composite.

Preferred fillers for the preparation of the composite filler are barium-free glass powders, in particular strontium glasses and/or zirconium-containing glass fillers. Strontium glass fillers are particularly preferred, wherein strontium glass powders with a particle size of from 0.4 to 1 µm are quite particularly preferred. The above-defined zirconium silicates are furthermore particularly preferred. Moreover, the above-defined $ZrO_2$ particles and the nanoscale ytterbium trifluoride used as component (b) are quite particularly preferred inorganic fillers for the preparation of the composite fillers.

In the case of aggregated or agglomerated particles, the primary particle size can be determined using TEM images. The transmission electron microscopy (TEM) is preferably carried out using a Philips CM30 TEM at an accelerating voltage of 300 kV. For the preparation of the specimens, drops of the particle dispersion are deposited on a 50 Å-thick copper grid (mesh size 300 Mesh) which is coated with carbon, and then the solvent is evaporated. The particles are counted and the arithmetic mean is calculated.

The inorganic fillers used for the preparation of the composite filler preferably have a refractive index of from 1.48 to 1.55, particularly preferably 1.50 to 1.53.

Composite fillers which have the following composition are preferred according to the invention:
- 8 to 50 wt.-%, preferably 10 to 30 wt.-%, radically polymerizable monomer,
- 1 to 20 wt.-%, preferably 2 to 15 wt.-%, ytterbium trifluoride particles with an average particle size of ≤25 nm,
- 40 to 90 wt.-%, preferably 60 to 80 wt.-%, further inorganic fillers and
- 0.01 to 2 wt.-%, preferably 0.1 to 1 wt.-%, initiator for the radical polymerization.

The percentage values relate to the total mass of the composite filler.

The compositions can be polymerized, milled and used as a powder. The polymerization is preferably effected thermally or photochemically. As a rule, milled particles have a splinter-like form. The milled composite fillers preferably have an average particle size of from 10 to 50 µm, particularly preferably from 10 to 40 µm, and quite particularly preferably from 30 to 40 µm. They preferably contain at most 10 wt.-%, based on the mass of the milled composite filler, of particles with an average size of <10 µm. Preferred composite fillers of this type and processes for the preparation thereof are described in EP 1 234 567 A2.

According to a particularly preferred embodiment, the particles of the composite filler have a spherical shape, wherein particles which do not have a perfect spherical shape are also meant here. Spherical particles can be prepared using so-called in-flight polymerization (aerosol polymerization), for example. For this purpose, the unpolymerized starting material for the preparation of the composite filler is sprayed, in the form of small droplets, into a polymerization chamber and then polymerized through irradiation with light of a suitable wavelength, preferably in the blue range. If required, the polymerizable mixture can be diluted with a suitable solvent before the spraying in order to set the particle size.

The photoinitiators named as component (e) are suitable as initiators for the light curing, in particular 4,4'-dichlorobenzil or derivatives thereof as well as camphorquinone, preferably in combination with an amine as accelerator, such as, for example, ethyl 4-(dimethylamino)benzoate, as well as dibenzoyl germanium derivatives such as bis-(4-methoxybenzoyl)diethylgermanium.

Spherical composite fillers can also contain the above-named substances as inorganic fillers, wherein strontium glass fillers, nanoscale $YbF_3$ and/or particularly the above-defined zirconium silicates are preferred here. The strontium glass powder preferably has a particle size in the range of from 0.4 to 1 µm, particularly preferably 0.5 to 0.8 µm.

The polymerized, spherical composite filler preferably has an average particle size of from 5 to 100 µm, particularly preferably from 10 to 80 µm, quite particularly preferably from 20 to 50 µm.

It was surprisingly found according to the invention that spherical composite fillers (d), in particular those which themselves contain spherical particles, such as zirconium silicate, and/or nanoscale radiopaque substances such as $YbF_3$, significantly improve the depth of cure and the flexural strength of the dental materials. Moreover, the addition of spherical composite fillers improves the polishability and gloss stability of the dental materials. In addition, these fillers improve the handling and the stability of the pastes.

The refractive indices of the filler (d) and of the monomer component (a) are preferably matched to each other such that the refractive index of the component (a) corresponds to the refractive index of the filler (d), or at most is 0.025 greater. The refractive index of the monomer component (a) is preferably at most up to 0.02, particularly preferably at most up to 0.01, greater than the refractive index of the filler (d).

The materials according to the invention can contain a filler or a filler mixture as filler (d). When filler mixtures are used, materials are preferred which contain as component (d) predominantly, i.e. more than 50 wt.-%, particularly preferably more than 80 wt.-%, in each case based on the total mass of the component (d), particularly preferably exclusively those composite fillers the refractive indices of which satisfy the named condition.

Composite fillers (d) are preferably used in an amount of from 5 to 60 wt.-%, particularly preferably 10 to 50 wt.-%, and quite particularly preferably from 15 to 40 wt.-%, based on the total mass of the dental material.

Initiator for the Radical Polymerization (e)

The materials according to the invention contain, as component (e), at least one initiator for the radical polymerization, preferably a photoinitiator.

Photosensitizers, above all α-diketones, such as 9,10-phenanthrenequinone, 1-phenyl-propane-1,2-dione, diacetyl or 4,4'-dichlorobenzil or derivatives thereof, particularly preferably camphorquinone (CQ) and derivatives thereof, and mixtures thereof, are preferred photoinitiators.

The photoinitiators are preferably used in combination with accelerators. Tertiary amines, such as e.g. tertiary aromatic amines, in particular N,N-dialkyl-anilines, -p-toluidines or -3,5-xylidines, p-(N,N-dialkylamino)-phenylethanol, -benzoic acid derivatives, -benzaldehyde, -phenylacetic acid esters and -phenylpropionic acid esters are particularly suitable as accelerators. Specific examples thereof are N,N-dimethylaniline, N,N-dimethyl-p-toluidine, N,N,3,5-tetramethylaniline, N,N-dimethylamino-p-benzaldehyde, p-(dimethylamino)-benzoic acid ethyl ester or p-(dimethylamino)-benzonitrile. Tertiary aliphatic amines, such as e.g. tri-n-butylamine, dimethylaminoethan-2-ol, triethanolamine, dimethylaminoethyl methacrylate, N,N-dimethylbenzylamine, or heterocyclic amines, such as e.g. 1,2,2,6,6-pentamethylpiperidine, and amino acid derivatives, such as e.g. N-phenylglycine, are also suitable. Alternatively, amine-free accelerators can be used, such as e.g. sulfinic acids and sulfinates, borates, enolates, phosphines or other compounds which contain active hydrogen atoms, e.g. heterocyclic compounds such as morpholine derivatives or 1,3-dioxolanes.

Particularly preferred photoinitiators are acyl- or bisacylgermanium compounds, in particular the monoacyltrialkyl- and bisacyldialkylgermanium compounds disclosed in EP 1 905 413 A1, such as e.g. benzoyltrimethylgermanium, bisbenzoyldiethyl-germanium or bis(4-methoxybenzoyl)diethylgermanium. Acyl- and bisacylgermanium compounds have the advantage that they are decolorized after irradiation (bleaching effect), and thus do not impair the transmittance of the cured materials. Moreover, they are monomolecular photoinitiators, i.e. they do not require an accelerator in order to reach their full activity.

Further particularly preferred photoinitiators are acyl- or bisacylphosphine oxides, in particular the initiators described in EP 0 007 505, EP 0 073 413, EP 0 184 095 and EP 0 615 980. Preferred examples are the commercially available compounds 2,4,6-trimethylbenzoyldiphenylphosphine oxide (Lucirine TPO, BASF) and bis(2,4,6-trimethylbenzoyl)phenylphosphine oxide (Irgacure® 819, Ciba). Acyl- and bisacylphosphine oxides also belong to the group of the monomolecular photoinitiators and are characterized by a low inherent absorption.

Compositions according to the invention which contain one of the named initiators can be cured, for example, by irradiation with blue light (wavelength range from 400 to 500 nm), preferably by irradiation with an LED lamp with a power rating between 1200 mW/cm$^2$ and 3050 mW/cm$^2$.

Initiators are preferably used in an amount of from 0.005 to 3.0 wt.-%, particularly preferably 0.01 to 2.0 wt.-%, particularly preferably 0.1 to 1 wt.-%, based on the total mass of the dental material.

Further Constituents

The compositions according to the invention can also contain further additives, most notably rheology modifiers, stabilizers, such as e.g. polymerization stabilizers, colorants, i.e. pigments and/or dyes, antibacterial active compounds, fluoride ion-releasing additives, optical brighteners, fluorescent agents, UV absorbers, substances for improving the fracture toughness and/or effect agents. The total amount of additives is preferably at most 4 wt.-%, particularly preferably at most 3 wt.-%, based on the total mass of the material.

The dental materials according to the invention preferably contain:
- 5 to 40 wt.-%, preferably 10 to 35 wt.-%, particularly preferably 12 to 30 wt.-% of at least one radically polymerizable monomer (a),
- 1 to 30 wt.-%, preferably 3 to 20 wt.-%, particularly preferably 6 to 12 wt.-% ytterbium trifluoride particles (b),
- 20 to 90 wt.-%, preferably 30 to 70 wt.-%, particularly preferably 40 to 65 wt.-% inorganic filler (c),
- 5 to 60 wt.-%, preferably 10 to 50 wt.-%, particularly preferably 15 to 40% composite filler (d) and
- 0.005 to 3.0 wt.-%, preferably 0.01 to 2.0 wt.-%, particularly preferably 0.1 to 1 wt.-% initiator for the radical polymerization (e).

Dental materials which have the following composition are particularly preferred:
- 12 to 30 wt.-% radically polymerizable monomers (a),
- 3 to 10 wt.-% ytterbium trifluoride particles (b),
- 45 to 65 wt.-% inorganic filler (c),
- 15 to 40 wt.-% composite filler (d) and
- 0.01 to 0.5 wt.-% initiator for the radical polymerization (e).

The percentage values relate in each case to the total mass of the dental material.

The quantities specified for component (b) do not include the ytterbium trifluoride optionally contained in component (d).

Naturally, those materials are preferred in which the components (a) to (e) are selected from the above-defined preferred and particularly preferred materials.

Quite particularly preferred in each case are materials in which the monomer component (a) contains overall 1 to 25 wt.-%, preferably 2 to 20 wt.-%, and quite particularly preferably 5 to 12 wt.-% V850 and/or V837, 1 to 60 wt.-%, preferably 5 to 30 wt.-%, and quite particularly preferably 10 to 25 wt.-% of a urethane dimethacrylate with aromatic groups, preferably V380, and 1 to 70 wt.-%, preferably 2 to 66 wt.-%, and quite particularly preferably 5 to 46 wt.-% further urethane dimethacrylate, preferably RM3, in each case based on the total mass of the monomer component (a). The monomer component (a) preferably additionally contains 2 to 40 wt.-%, preferably 4 to 30 wt.-%, and quite particularly preferably 6 to 25 wt.-% SR348C. Moreover, the monomer component (a) preferably additionally contains 2 to 40 wt.-%, preferably 7 to 30 wt.-%, and quite particularly preferably 10 to 25 wt.-% TCP.

The dental materials according to the invention preferably contain overall 30 to 95 wt.-%, particularly preferably 50 to 90 wt.-%, and quite particularly preferably 65 to 85 wt.-% fillers (components (b), (c) and (d)), based on the total mass of the dental material.

The dental materials according to the invention are characterized by a high radiopacity. This allows a clear distinction from the natural tooth substance. The radiopacity is determined in accordance with the ISO standard 4049. Here, a test piece made of the polymerized dental material together with an aluminium step wedge with a step height of 1 mm is photographed using an X-ray camera. The degree of darkness of the images is compared and the radiopacity is indicated in % Al; 100% radiopacity corresponds to the degree of darkness of 1 mm of aluminium.

The materials according to the invention preferably have a radiopacity of from 140% to 350% Al, particularly preferably from 160% to 250% Al.

The radiopacity is preferably obtained through the addition of nanoscale $YbF_3$ particles with an average particle size of ≤25 nm (component b). Dental materials are particularly preferred in which the composite filler (d) additionally also contains nanoscale $YbF_3$ particles with an average particle size of ≤25 nm. The dental materials according to the invention preferably contain overall, i.e. in the components (b) and (d), 2 to 30 wt.-%, particularly preferably 3 to 20 wt.-%, and quite particularly preferably 4 to 12 wt.-% nanoscale $YbF_3$, based on the total mass of the material.

The dental materials according to the invention are furthermore characterized by a large depth of cure. The depth of cure is determined according to DIN EN ISO 4049:2018-04 and is preferably 3 mm or more, particularly preferably 3.5 to 5 mm. It is advantageous that these depths of cure can be realized in the case of the materials according to the invention with a short exposure time of only 3 seconds (at 3050 mW/cm$^2$).

A particular advantage of the dental materials according to the invention is their excellent aesthetic properties. These make it possible to produce a dental restoration that is aesthetically convincing in every respect with only one material. It is not necessary to combine several materials with each other in order to produce an appealing restoration. In addition, the entire naturally occurring colour space of human teeth can be covered with only a few shades.

This effect is achieved through a particular ratio of contrast value (CR value) to transmittance. The dental materials according to the invention preferably have a CR value of from 60 to 75, particularly preferably from 62 to 70, and quite particularly preferably from 64 to 68. The transmittance of the coloured materials preferably lies between 8 and 25%, particularly preferably between 9 and 22%, and quite particularly preferably between 10 and 18%. All data relate to the cured materials.

By the CR value is meant the ratio of the transmittance measurements on a white and on a black background. The value is also referred to as opacity. The contrast value CR is determined in accordance with BS 5612 (British Standard) using a spectrophotometer (e.g. Minolta CM-3700d). The determination of the contrast value consists of two individual measurements. For this purpose, the test piece to be analyzed is arranged in front of a black ceramic body with a maximum reflectance of 4%, and then in front of a white ceramic body with a minimum reflectance of 86%, and these are then analyzed colorimetrically. When highly transparent test pieces are used, reflection/absorption is mainly caused by the ceramic background, whereas the reflection by the test piece is caused when an opaque material is used. The ratio of reflected light in front of a black background to reflected light in front of a white background is the measure for the contrast value, wherein complete transmission results in a contrast value of 0 and complete opacity results in a contrast value of 100.

The interaction of CR value and transmittance yields materials with outstanding aesthetic properties. A transmittance in the range according to the invention allows the ambient light to penetrate into the material and allows it to appear living. At the same time, in materials with a CR value according to the invention the colour, radiating into the material, of the surrounding hard dental tissue is refracted such that the material appears to have a similar colour to the hard dental tissue.

As a result of these properties, the materials according to the invention can completely cover the colour space of natural tooth colours, which usually comprises the 16 shades of the VITA classical A1-D4® shade guide, with a few shades. In the case of the materials according to the invention, each shade covers several shades of the usual 16 shades because of the defined CR value and the defined transmittance in combination with its specific shade and lightness setting. The materials blend into the natural tooth in an ideal manner since on the one hand they take on the colour of the surrounding hard dental tissue and at the same time have enough colour and opacity that a greyish appearance is avoided.

The dental materials are primarily suited to intraoral application by the dentist for the restoration of damaged teeth (therapeutic application), in particular as dental cements, coating or veneering materials, and quite particularly as filling composites and as so-called bulk-fill composites.

The materials according to the invention have a high stability and a low tack and are packable. This means that they can be processed and introduced into tooth cavities and compacted in a similar way to amalgam. They are therefore excellently suitable as tooth filling materials, in particular for direct and indirect anterior and side tooth fillings of all classes. These properties are achieved through the choice of monomers, type of filler and amount of filler according to the invention.

The dental materials according to the invention are characterized by an advantageous combination of properties. The invention makes it possible to prepare materials with a high filler content, which is advantageous for tooth filling materials, without impairing the depth of cure and the aesthetic properties of the materials. Because of their optical properties, the materials according to the invention can therefore also be cured very well using light in large layer thicknesses. They are thus particularly suitable for use as bulk-fill composites. By bulk-fill composites is meant dental filling materials which can be cured using light in layers with a thickness of more than 3 mm, preferably more than 4 mm, and in particular from 4 to 5 mm. They allow even large tooth fillings to be produced with only 1 to 2 layers.

The materials according to the invention can also be used extraorally (non-therapeutically), for example in the production or repair of dental restorations (non-therapeutic application). They are suitable in particular as materials for the production of inlays, onlays, crowns or bridges.

BRIEF DESCRIPTION OF THE DRAWINGS

The invention is explained in more detail below by means of figures and examples.

DETAILED DESCRIPTION

Examples

Figure 1:
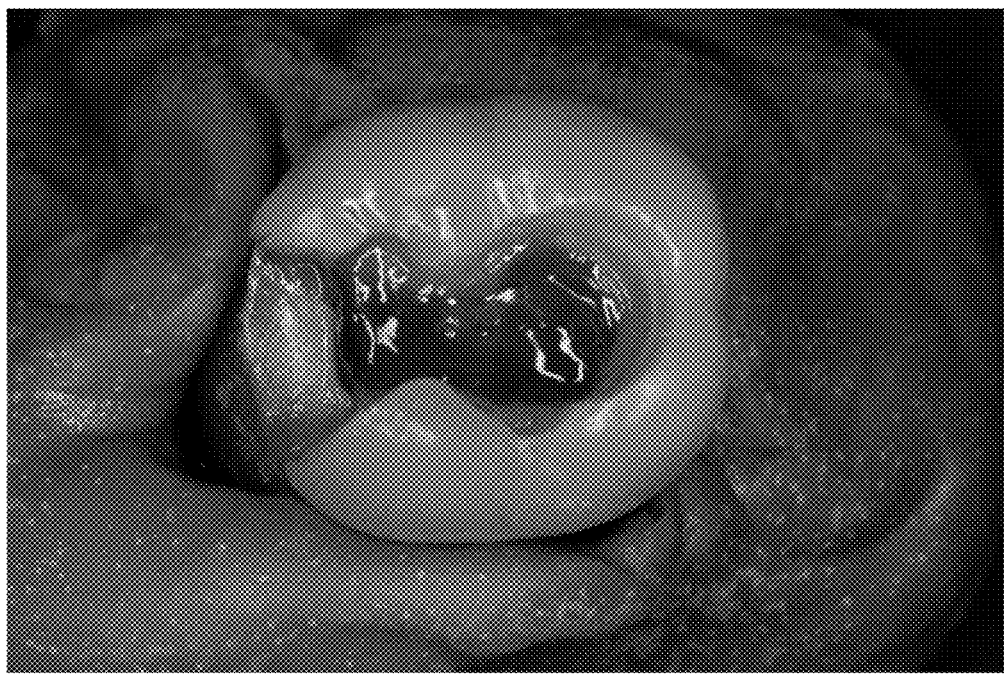
FIG. 1 shows a class 2 cavity in a human molar with strongly coloured cavity bottom.

Using the formulations indicated in the following embodiment examples, dental materials were prepared and tested as described. The components were mixed with each other using a magnetic stirrer, a kneader (LPM 0.5 SP machine from Linden) or using a centrifugal mixer (Speedmixer DAC 600.2 from Hauschild).

To determine the transmittance of the materials, cured round test pieces (diameter: 20 mm, h=1 mm) were produced and measured colorimetrically with the aid of a spectrophotometer (CM-5 spectrophotometer, Minolta). The polymerization was effected with an LED lamp (3 s at 3050 mW/cm$^2$).

The measurement of flexural strength and depth of cure was effected in accordance with ISO 4049:2009: Dentistry—Polymer-based restorative materials. Here, the stated value for the depth of cure (DOC) corresponds to half the measured value. From a measured value of DOC/2≥3.5 mm, a material may be referred to as bulk-fillable and a depth of cure of at least 4 mm under dental conditions is deemed to be assured.

The Vickers hardness was determined using a Vickers hardness tester from Zwick (ZHV 0.2). In addition, the depth of cure [in mm] at which the Vickers hardness of a polymerized test piece, ground down transversely up to the middle, still amounts to 80% of the surface hardness is indicated.

The radiopacity and the CR value were determined in the manner described in the description.

In the examples, the following materials are used:
accelerator ethyl 4-(dimethylamino)benzoate (CAS No. 10287-53-3)
bis-GMA bisphenol A glycidyl methacrylate (CAS No. 1565-94-2)
BHT butylhydroxytoluene
TCP tricyclodecane dimethanol diacrylate (CAS No. 42594-17-2)
D$_3$MA 1,10-decanediol dimethacrylate
MA836 2-([1,1'-biphenyl]-2-oxy)ethyl methacrylate
Ge photoinitiator bis(4-methoxybenzoyl)diethylgermanium (CAS No. 1469766-31-1)
phosphine oxide diphenyl(2,4,6-trimethylbenzoyl)phosphine oxide (photoinitiator)
glass filler 1 barium-free Sr-, Al- and F-containing dental glass with 6% silanization, average grain size 0.7 µm, refractive index 1.50 (glass G018-163)
glass filler 2 radiopaque dental glass powder with 6% silanisation, refractive index 1.50 (Schott Glass G018-430)
chain regulator 2-(toluene-4-sulfonylmethyl)acrylic acid ethyl ester
RM3 7,7(9)9-trimethyl-4,3-dioxo-3,14-dioxa-5,12-diazo-hexadecane-1,16-diyldimethacrylate
zirconium silicate spherical zirconium silicate particles, average primary particle size: 20 nm, secondary particle size: 3.44 µm, refractive index 1.50
SR-348C ethoxylated bisphenol A dimethacrylate (CAS No. 41637-38-1)
V380 urethane dimethacrylate with aromatic groups
V850 methacrylic acid-2-{[2-(N-methylacrylamido)-ethoxycarbonyl]-amino}-ethyl ester
nYbF$_3$ nanoscale ytterbium trifluoride, average particle size 14 nm
YbF$_3$ powdered ytterbium trifluoride, average particle size 100 nm
ZrO$_2$ non-agglomerated ZrO$_2$ particles with a primary particle size of 8 nm
V837 N-(2-methacryloyloxyethyl)carbamic acid-(2-methacryloyloxy-ethyl)ester (CAS No. 139096-43-8)

Example 1

Preparation of a Composite Filler (Comparison Example)

A composite material with the composition indicated in Table 1 was prepared in the manner described in Example 1 of EP 1 234 567 A2. The material was thermally cured, subsequently coarsely crushed and then milled using a ball mill to an average grain size of 25 µm. The refractive index of the monomer mixture used was 1.484 before the polymerization and 1.509 after the polymerization. The refractive index of the composite filler was 1.506.

TABLE 1

Composition of the composite filler

| Name | Proportion [wt.-%] |
|---|---|
| V 380 | 4.4 |
| RM3 | 4.6 |
| D$_3$MA | 12.3 |
| Dibenzoyl peroxide | 0.69 |
| BHT | 0.01 |
| Glass filler 1 | 78 |
| Total | 100 |

Example 2

Preparation of a Radiopaque Composite Filler

A composite material with the composition indicated in Table 2 was prepared in the manner described in Example 1 of EP 1 234 567 A2. For this purpose, first of all the monomers were mixed with each other and then the ytterbium trifluoride was incorporated into a portion of the monomer mixture. This was mixed with the remaining monomers and thereafter the glass filler was incorporated homogeneously into the resulting mixture. The material was thermally cured, subsequently coarsely crushed and then milled using a ball mill to an average grain size of 25 µm. The refractive index of the monomer mixture used was 1.482. After the polymerization it was 1.514. The composite filler had a refractive index of 1.506.

TABLE 2

Composition of the radiopaque composite filler

| Component | Proportion [wt.-%] |
|---|---|
| V380 | 3.85 |
| RM3 | 3.85 |
| D$_3$MA | 8.13 |
| nYbF$_3$ | 5.5 |
| Dibenzoyl peroxide | 0.66 |
| BHT | 0.01 |
| Glass filler 1 | 78 |
| Total | 100 |

Example 3

Dental Material Based on the Composite Filler from Ex. 1 (Comparison Example)

For the preparation of a dental material with the composition indicated in Table 3, first of all the named monomers were stirred with each other for 12 hours, in order to dissolve all the components. Then, the powdered components were added and homogeneously mixed to form a paste using a mixer (Speedmixer DAC 600.2 VAC-P from Hauschild). The refractive index of the uncured monomer mixture was 1.510.

TABLE 3

Composition of the composite paste

| Component | Proportion [wt.-%] |
|---|---|
| Bis-GMA | 5.45 |
| SR-348C | 2.48 |
| V380 | 3.96 |
| RM3 | 12.00 |
| TCP | 2.64 |
| Camphorquinone | 0.05 |
| Accelerator | 0.21 |
| Ge photoinitiator | 0.05 |
| Additives | 0.06 |
| Composite filler from Ex. 1 | 17.00 |
| Glass filler 1 | 56.10 |
| Total | 100 |

Depth of cure (DOC/2), transmittance, flexural strength, elastic modulus and radiopacity were measured as described above. The results are indicated in Table 5.

Example 4

Dental Material Based on the Composite Filler from Example 2

For the preparation of a dental material with the composition indicated in Table 4, first of all the named monomers were homogeneously mixed with stirring and then the YbF$_3$ was incorporated into a portion of the mixture, with the result that a transparent liquid was obtained. Thereafter, the remaining monomers and then the powdered components were added and homogeneously mixed to form a paste. The filler enriched with YbF$_3$ from Example 2 was used as composite filler. The refractive index of the uncured monomer mixture was 1.508.

TABLE 4

Composition of the radiopaque composite paste

| Component | Proportion [wt.-%] |
|---|---|
| Bis-GMA | 2.98 |
| SR-348C | 1.45 |
| V380 | 4.36 |
| RM3 | 9.95 |
| TCP | 2.91 |
| Camphorquinone | 0.05 |
| Accelerator | 0.21 |
| Ge photoinitiator | 0.05 |
| Composite filler from Ex. 2 | 17.00 |
| Additives | 0.06 |
| Glass filler 1 | 53.74 |
| nYbF$_3$ | 7.30 |
| Total | 100.06 |

The material was analyzed in the manner described above. The results are indicated in Table 5.

TABLE 5

Properties of the cured dental materials

| Measurement parameter | Ex. 3*) | Ex. 4 |
|---|---|---|
| DOC/2 | 4.1 | 4.5 |
| Transmittance (%) | 15.14 | 18.19 |
| Flexural strength (MPa) | 111 | 114.7 |
| Depth of cure at 80% hardness [mm] | 6.5 | 6.8 |
| Radiopacity (% Al) | 90 | 190 |

*)Comparison example

Table 5 shows that the addition of nanoparticulate $YbF_3$ does not have a negative effect on the properties of the paste. The paste according to the invention has a high depth of cure and transmittance in spite of significantly higher radiopacity.

Example 5

Dental Material Based on the Composite Filler from Example 2

For the preparation of a dental material with the composition indicated in Table 6, first of all the monomers bis-GMA, RM3 and Sr-348C were homogeneously mixed with stirring and then the $YbF_3$ was incorporated into the mixture, with the result that a transparent liquid was obtained. The refractive index of this mixture was 1.509 before and 1.533 after the polymerization. The difference between these values is 0.024. Thereafter, the remaining monomers and then the powdered components were added and homogeneously mixed to form a paste.

The material was analyzed in the manner described above. The results are indicated in Table 7. All the values exceed the requirement of the dental standard EN-ISO 4049.

TABLE 6

Composition of the radiopaque composite paste

| Component | Proportion [wt.-%] |
|---|---|
| Bis-GMA | 2.9 |
| SR-348 | 1.4 |
| RM3 | 9.7 |
| TCP | 2.8 |
| V380 | 2.8 |
| V850 | 1.4 |
| Additives | 0.1 |
| Accelerator | 0.2 |
| Ge photoinitiator | 0.1 |
| Camphorquinone | 0.1 |
| Composite filler from Ex. 2 | 20.0 |
| Glass filler 1 | 51.3 |
| $nYbF_3$ | 7.2 |
| Total | 100 |

TABLE 7

Properties of the cured dental material

| Measurement parameter | Material |
|---|---|
| DOC/2 (mm) | 4.3 |
| Transmittance (%) | 17.5 |
| Flexural strength (MPa) | 105 |
| Depth of cure at 80% hardness [mm] | 6.6 |
| Radiopacity (% Al) | 160 |
| CR value | 60.8 |

Example 6

Colouring the Dental Material from Example 5

The composite paste from Example 5 was set to the following L, a, b, CR values by the stepwise addition of the pigment Sicotrans Red and intensive mixing. Then the paste was deaerated in a centrifugal mixer (SpeedMixer, Hauschild & Co. KG, Germany) for 5 min at 23,500 revolutions/min and 100 mbar.

| L* | a* | b* | CR |
|---|---|---|---|
| 81 | 6.63 | 26.28 | 63.35 |

L*: Lightness,
a*: Red value,
b*: Yellow value,
CR: Contrast ratio

The colours were determined according to the L*a*b* colour model corresponding to DIN EN ISO 11664-4. The colour measurement was carried out with a commercially available measuring instrument (Minolta CM-3700d spectrophotometer). The depth of cure (DOC/2) was 3.7 mm.

Figure 2:
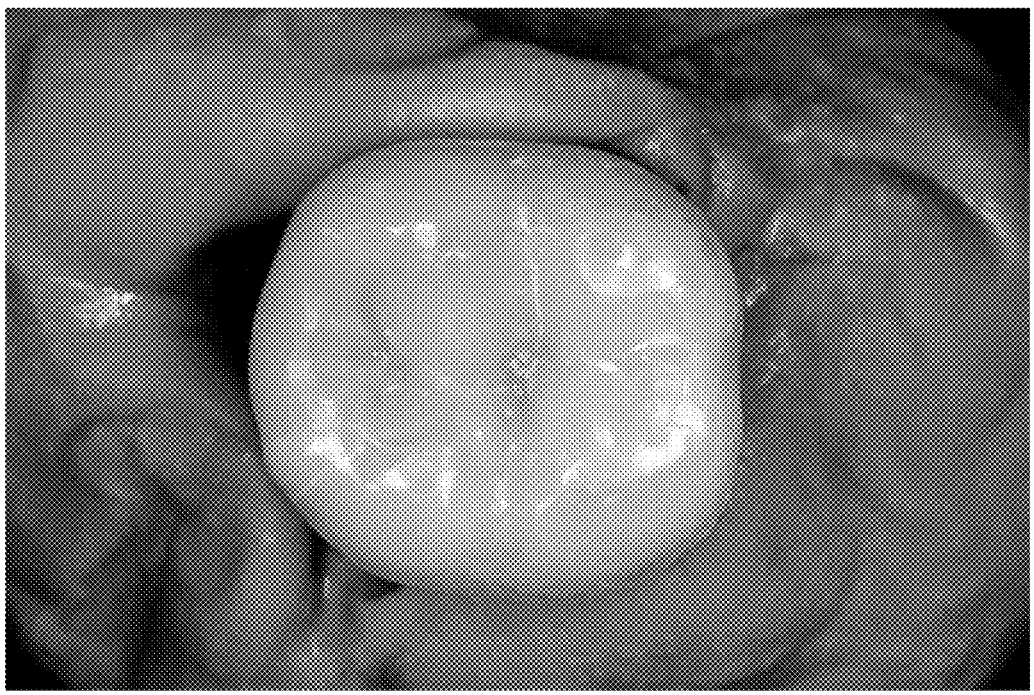
FIG. 2 shows the human molar from FIG. 1, filled with the dental material according to the invention from Example 6.
Figure 3:
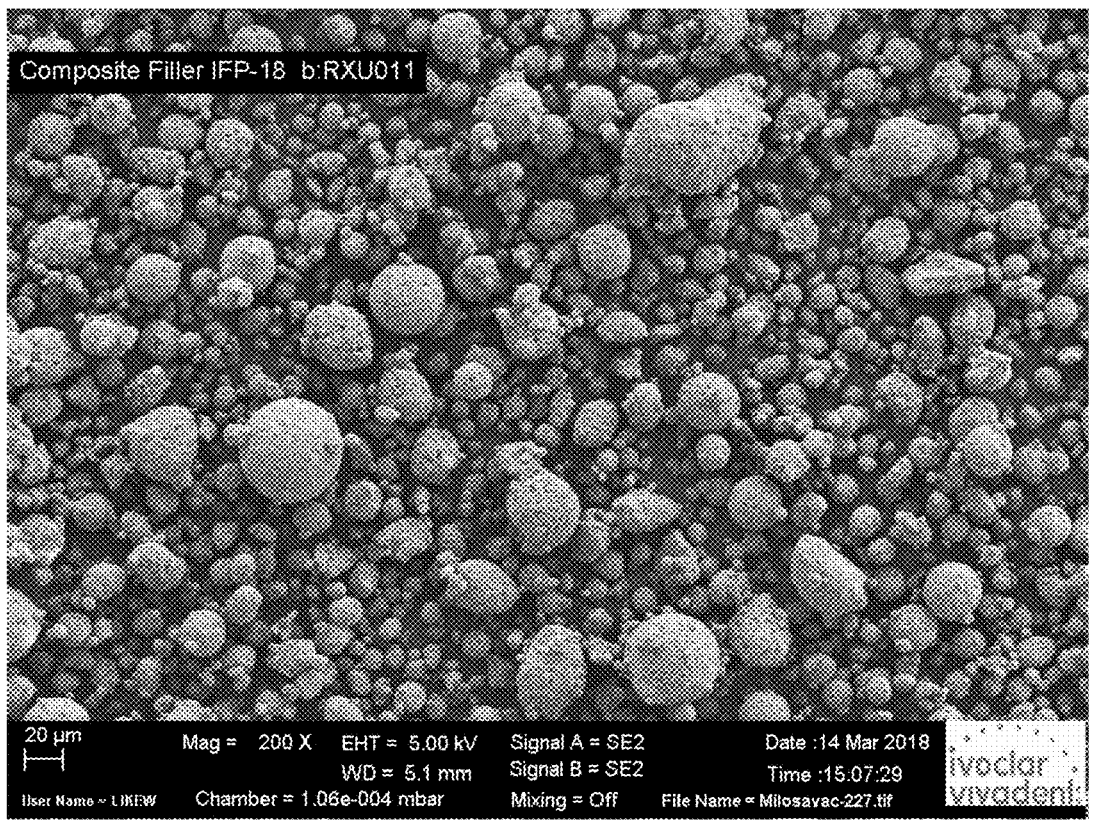
FIG. 3 shows a scanning electron micrograph of the spherical particles from Example 8.

To check the covering behaviour, an extracted human side tooth corresponding to the Vita shade A3.5 was drilled out and the cavity bottom was coloured greyish-black using two flowable effect materials (Empress Direct Color Grey and Empress Direct Color Brown; from Ivoclar Vivadent AG). FIG. 1 shows the coloured cavity bottom, FIG. 2 shows the same tooth filled with the above dental material. The discoloration hardly shows through; the tooth looks very natural. As a result of the good depth of cure, the material can be cured in one layer in the 4-mm-deep cavity.

Example 7

Comparison of Dental Materials with Nanoscale and Conventional $YbF_3$

Materials with the composition indicated in Table 8 (materials A and C) were prepared in the manner described in Example 3. In parallel to this, a radiopaque dental material with the composition also indicated in Table 8 (material B) was prepared in the manner described in Example 5. The materials were analyzed in the manner described above. The results are indicated in Table 9.

TABLE 8

Composition of materials A, B and C

| Component | Material A*) [wt.-%] | Material B [wt.-%] | Material C [wt.-%] |
|---|---|---|---|
| Bis-GMA | 3.88 | 2.90 | 3.88 |
| SR-348C | 1.89 | 1.40 | 1.89 |
| V380 | 3.60 | 2.70 | 3.60 |
| V850 | 1.86 | 1.39 | 1.86 |
| RM3 | 12.61 | 9.45 | 12.61 |
| TCP | 3.66 | 2.74 | 3.66 |
| Additives | 0.08 | 0.08 | 0.08 |
| Camphorquinone | 0.05 | 0.05 | 0.05 |
| Accelerator | 0.21 | 0.21 | 0.21 |

TABLE 8-continued

Composition of materials A, B and C

| Component | Material A*) [wt.-%] | Material B [wt.-%] | Material C [wt.-%] |
|---|---|---|---|
| Ge photoinitiator | 0.05 | 0.05 | 0.05 |
| Composite filler from Ex. 1 | 20 | 0 | 20 |
| Composite filler from Ex. 2 | 0 | 20 | 0 |
| Glass filler 1 | 52.11 | 51.81 | 47.11 |
| YbF$_3$(100 nm) | 0 | 0 | 5 |
| nYbF$_3$ (14 nm) | 0 | 7.22 | 0 |
| Total | 100 | 100 | 100 |

*)Comparison example

The materials have a similar composition, with the difference that material A contains no YbF$_3$, material B contains nanoscale YbF$_3$ (nYbF$_3$) and material C contains YbF$_3$ powder with an average particle size of 100 nm. Materials A and B have a comparable depth of cure DOC/2 of 4.3 mm and 4.2 mm, respectively. This shows that the addition of the nanoscale YbF$_3$ does not significantly impair the depth of cure. A sufficiently large scope thus remains for coloration of the materials. Pigments and other dyes can be added up to the threshold value for bulk-fill materials of 3.5 mm. In contrast, material C only has a DOC/2 of 3.8 mm. Here, only a little scope is available for coloration. The clouding effect of larger YbF$_3$ particles becomes clear here. Moreover, the difference between the transmittance before and after the curing is significantly lower in the case of material C than in the case of material B, which is preferred according to the invention. Material C is thus less well-suited as bulk-fill material. In contrast, the comparison of materials A and B shows that the addition of nanoscale YbF$_3$ only has a small influence on the difference between the transparency before and after the curing. This shows that nanoscale ytterbium fluoride is best suited to increasing the radiopacity without impairing the optical properties of the material to a significant degree.

TABLE 9

Properties of the cured dental materials

| Measurement parameter | Material A*) | Material B | Material C |
|---|---|---|---|
| DOC/2 (mm) | 4.3 | 4.2 | 3.8 |
| Transmittance (%) before the curing | 40.3 | 36.8 | 29.4 |
| Transmittance (%) after the curing | 19.3 | 17.8 | 16.4 |
| Difference | −21 | −19 | −13 |
| Flexural strength (MPa) | 106 | 106 | 113 |
| Radiopacity (% Al) | 90 | 190 | 180 |

Example 8

Preparation of Composite Filler with Spherical Particles

Figure 4:
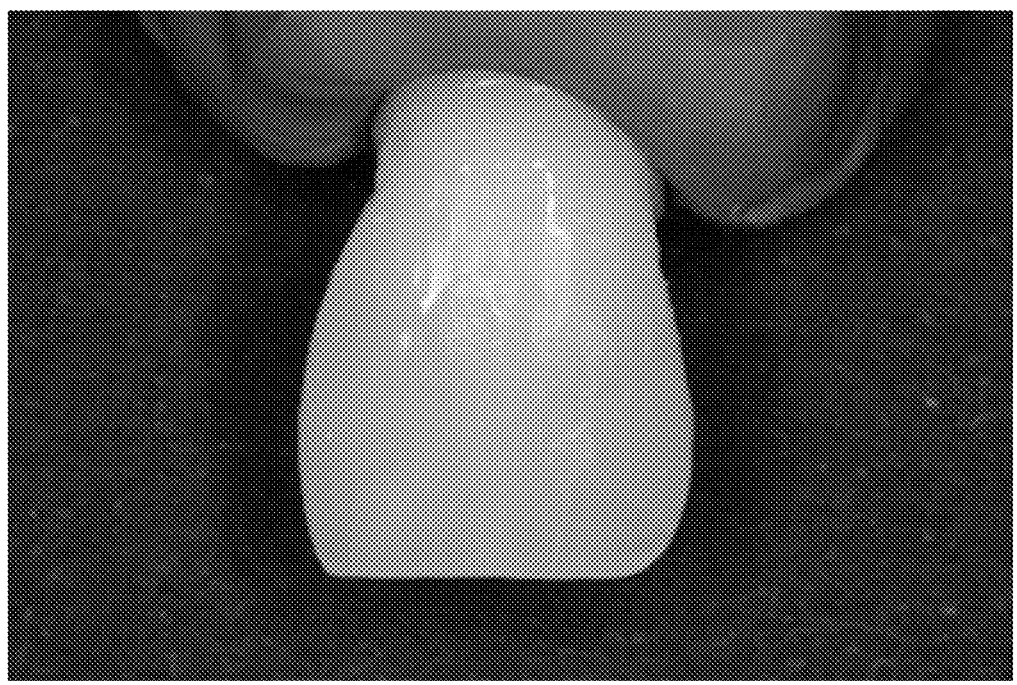
FIG. 4 shows a bleached human anterior tooth with class 3 mesiobuccal and distobuccal fillings, which were placed using the dental material from Example 10. The fillings blend naturally into the tooth and are practically invisible.

For the preparation of a composite filler with the composition indicated in Table 10, first of all the monomers named in the table were mixed with each other and then the zirconium silicate was incorporated into the monomer mixture. The dispersion was effected in a glass cylinder by moderate stirring for 6 to 24 hours. Then, 0.3 wt.-% camphorquinone and 0.6 wt.-% ethyl 4-(dimethylamino)benzoate were added and further stirred until the initiator components had dissolved. The mixture was then pumped, at 20 ml/min, into an atomizing nozzle, which was operated at a pressure of 2.1 bar under nitrogen. The finely atomized droplets were polymerized using six 100-Watt LED lamps of the wavelength 470 nm. The size of the cured particles was determined by means of laser diffraction (Microtrac X100 particle size analyzer). The particles had a spherical structure and an average particle size of 20 µm. The particle size can be controlled by the addition of acetone to the monomer mixture before the atomizing (0 to 25%). FIG. 4 shows a scanning electron micrograph of the spherical particles. The composite filler had a refractive index of 1.506.

TABLE 10

Composition of the spherical composite filler

| Component | Proportion [wt.-%] |
|---|---|
| V380 | 7.40 |
| RM3 | 8.18 |
| D$_3$MA | 14.12 |
| Camphorquinone | 0.3 |
| Accelerator | 0.6 |
| Zirconium silicate | 69.4 |
| Total | 100 |

Example 9

Preparation of a Radiopaque Composite Filler with Spherical Particles

Analogously to the manner described in Example 8, a spherical composite filler with the composition described in Table 11 was prepared. The filler additionally contains nanoscale YbF$_3$ particles. For the preparation of the composite filler, the monomers named in the table were mixed with each other and then the ytterbium trifluoride and subsequently the further fillers were incorporated into the monomer mixture. The monomer mixture had a refractive index of 1.478, the refractive index of a mixture made of 50% monomer mixture and 50% YbF$_3$ had a refractive index of 1.481. The refractive index of the YbF$_3$ was 1.54.

TABLE 11

Composition of the spherical composite filler

| Component | Proportion [wt.-%] |
|---|---|
| V380 | 3.75 |
| RM3 | 4.10 |
| D$_3$MA | 7.05 |
| nYbF$_3$ | 15.00 |
| Camphorquinone and accelerator | 0.90 |
| Zirconium silicate | 34.60 |
| Glass filler 1 | 34.60 |
| Total | 100 |

Example 10

Dental Material Based on the Composite Filler from Ex. 8

For the preparation of a dental material with the composition indicated in Table 12, first of all the named monomers were homogeneously mixed with stirring and then the YbF$_3$ was incorporated into a portion of the mixture, with the result that a largely transparent liquid was obtained. Then, the remaining monomers and thereafter the powdered components were added and homogeneously mixed to form a paste. The material was analyzed in the manner described above. The results are indicated in Table 13.

The paste has a very good depth of cure. This is also reflected in the good value of approx. 7 mm for the depth of cure at 80% of the Vickers hardness. Pastes of this type can be pigmented without problems, without losing their bulk-fill properties. In comparison with Example 5, a significant improvement in the flexural strength could be achieved by using the spherical composite filler from Example 8 in place of the milled composite filler from Example 2.

TABLE 12

Composition of the radiopaque composite paste

| Component | Proportion [wt.-%] |
| --- | --- |
| Bis-GMA | 2.78 |
| SR-348C | 1.35 |
| RM3 | 9.25 |
| V380 | 2.68 |
| V850 | 4.12 |
| Additives | 0.09 |
| Chain regulator | 1.16 |
| Accelerator | 0.21 |
| Ge photoinitiator | 0.05 |
| Camphorquinone | 0.05 |
| Composite filler from Ex. 8 | 27.25 |
| Glass filler 1 | 44.21 |
| $nYbF_3$ | 6.8 |
| Total | 100 |

TABLE 13

Properties of the cured dental material

| Measurement parameter | Material |
| --- | --- |
| DOC/2 (mm) | 4.2 |
| Transmittance (%) | 17.0 |
| Flexural strength (MPa) | 136 |
| Depth of cure at 80% Vickers hardness [mm] | 6.9 |

Example 11

Bis-GMA-Free Dental Material Based on the Composite Filler from Example 9

For the preparation of a bis-GMA-free dental material with the composition indicated in Table 14, first of all the monomers named in the table were mixed with each other and then the ytterbium trifluoride was incorporated into the monomer mixture. Thereafter, the powdered components were added and homogeneously mixed to form a paste. The material was analyzed in the manner described above. The results are indicated in Table 15.

TABLE 14

Composition of the radiopaque composite paste

| Component | Proportion [wt.-%] |
| --- | --- |
| V380 | 4.67 |
| RM3 | 4.87 |

TABLE 14-continued

Composition of the radiopaque composite paste

| Component | Proportion [wt.-%] |
| --- | --- |
| SR-348C | 3.5 |
| TCP | 4.77 |
| V850 | 1.49 |
| Additives | 2.8 |
| $nYbF_3$ | 6.6 |
| Accelerator | 0.2 |
| Ge photoinitiator | 0.05 |
| Camphorquinone | 0.05 |
| Composite filler from Ex. 9 | 20 |
| Glass filler 1 | 51 |
| Total | 100 |

TABLE 15

Properties of the cured dental material

| Measurement parameter | Material |
| --- | --- |
| DOC/2 (mm) | 4.8 |
| Transmittance (%) before the curing | 45.1 |
| Transmittance (%) after the curing | 18.9 |
| Difference | 26.2 |
| Flexural strength (MPa) | 133 |
| Elastic modulus (MPa) | 1100 |
| Depth of cure at 80% Vickers hardness [mm] | 6.5 |
| Radiopacity (% Al) | 182 |
| CR value | 60.17 |

The paste has a very good flexural strength and an excellent depth of cure. The large difference between the transmittance before and after the curing enabled the light to penetrate deep into the initially very transparent paste and to cure the test piece even at depth. After the curing, the material had a lower transmittance, which is thus advantageous for aesthetic reasons.

Example 12

Coloration of the Paste from Example 11 in the Shade Bleach

The composite paste from Example 11 was set to the following L, a, b, CR values by the stepwise addition of white pigment. Then, the transmittance, depth of cure and the Vickers hardness were measured.

| $L^*$ | $a^*$ | $b^*$ | CR | Transmittance | DOC/2 | Vickers hardness |
| --- | --- | --- | --- | --- | --- | --- |
| 86.84 | 0.59 | 14.65 | 65.52 | 13.08 | 3.5 | 5.5 |

The DOC/2 achieved conforms to standards and, at a depth of 5.5 mm, the material still has 80% of the surface hardness.

FIG. 4 shows a bleached human anterior tooth with class 3 mesiobuccal and distobuccal fillings, which were placed using the coloured composite paste. The fillings blend naturally into the tooth. They can only be seen at all because of the magnified representation. At speaking distance, the fillings are invisible.

Filling materials with the Bleach shade are suitable for very bright teeth, such as for example milk teeth or for bleached teeth. Since the coloration to the Bleach shade requires a great deal of white pigment in order to create the bright impression, it leads to a greater loss in depth of cure than other shades which require fewer pigments. For this reason, materials with this coloration usually only have a low depth of cure. The above results show that, even with this shade, the material according to the invention has a relatively high depth of cure, which is sufficient for the use as bulk-fill material. It is thus possible to also produce other shades with a sufficient depth of cure.

Example 13

Dental Material Based on the Composite Filler from Example 9 and $ZrO_2$

The preparation of the dental material with the composition indicated in Table 16 was effected analogously to the examples described previously. In addition, the monomer mixture contained the monomer $D_3MA$. The $ZrO_2$ was suspended in the $D_3MA$ and this suspension was then mixed with the other constituents. The paste was polymerized for 3 s at 3050 mW/cm² and then analyzed in the manner described in Example 3. The results are indicated in Table 17.

The composite paste has a good depth of cure. The transmittance is lower in comparison with Example 8. In addition, the CR value could be increased through the increased content of $YbF_3$ and the addition of $ZrO_2$.

TABLE 16

Composition of the dental material

| Component | Proportion [wt.-%] |
| --- | --- |
| V380 | 3.66 |
| RM3 | 4.16 |
| SR-348C | 2.85 |
| TCP | 3.45 |
| V850 | 3.59 |
| $D_3MA$ | 0.87 |
| $ZrO_2$ | 0.58 |
| Additives | 0.08 |
| $nYbF_3$ | 9.39 |
| Accelerator | 0.16 |
| Ge photoinitiator | 0.04 |
| Camphorquinone | 0.04 |
| Composite filler from Ex. 9 | 30 |
| Glass filler 1 | 41.13 |
| Total | 100 |

TABLE 17

Properties of the cured dental material

| Measurement parameter | Material |
| --- | --- |
| DOC/2 (mm) | 4.1 |
| Transmittance (%) before the curing | 38.7 |
| Transmittance (%) after the curing | 15.9 |
| Difference | 22.8 |
| Flexural strength (MPa) | 136 |
| Depth of cure at 80% hardness | 6.5 |
| Radiopacity (% Al) | 183 |
| CR value (24 h after polymerization) | 62.4 |

Example 14

Coloration of the Paste from Example 13 in a Shade Suitable for Dark Teeth

The composite paste from Example 13 was set to the following L, a, b, CR values by the stepwise addition of the pigments Sicotrans Red and Xerogel yellow. Then, the transmittance, depth of cure and the Vickers hardness were measured.

| L* | a* | b* | CR | Transmittance | DOC/2 | Vickers hardness |
| --- | --- | --- | --- | --- | --- | --- |
| 78.71 | 9.33 | 31.0 | 65.0 | 13.08 | 3.5 | 5.2 |

The DOC/2 achieved conforms to standards, and at a depth of 5.5 mm, the material still has 80% of the surface hardness.

Figure 5:
FIG. 5 shows a human anterior tooth with class 3 mesiobuccal and distobuccal fillings, which were placed using the dental material from Example 14. The fillings blend naturally into the tooth and are practically invisible.

FIG. 5 shows a human anterior tooth, which would usually be restored with a filling with the shade A3.5 (Vita shade system), with class 3 mesiobuccal and distobuccal fillings which were placed using the coloured composite paste. The fillings blend naturally into the tooth. They can only be seen at all because of the magnified representation. At speaking distance, the fillings are invisible.

Dental materials for dark teeth require a relatively large amount of pigments for setting the shade. For this reason, such materials usually only have a low depth of cure. The above results show that the material according to the invention has a relatively high depth of cure, which is sufficient for the use as bulk-fill material. It is thus possible to also produce other shades with a sufficient depth of cure.

Example 15

Dental Material Based on the Composite Filler from Example 9 and Zirconium Silicate Analogously to Example 13, a dental material was prepared which additionally contained zirconium silicate as filler and a higher proportion of $ZrO_2$. The composition is indicated in Table 18. The paste was polymerized for 3 s at 3050 mW/cm² and then analyzed in the manner described in Example 3. The results are indicated in Table 19. The measurement results identify the composite as a bulkable paste with good radiopacity.

TABLE 18

Composition of the dental material

| Component | Proportion [wt.-%] |
| --- | --- |
| V-380 | 3.71 |
| RM3 | 4.05 |
| SR 348C | 2.50 |
| TCP | 3.2 |
| V850 | 3.12 |
| $D_3MA$ | 1.44 |
| $ZrO_2$ | 0.96 |
| Additives | 0.08 |
| $nYbF_3$ | 7.2 |
| Accelerator | 0.16 |

TABLE 18-continued

Composition of the dental material

| Component | Proportion [wt.-%] |
| --- | --- |
| Ge photoinitiator | 0.04 |
| Camphorquinone | 0.04 |
| Composite filler from Ex. 9 | 30.00 |
| Glass filler 1 | 33.50 |
| Zirconium silicate | 10.00 |
| Total | 100 |

TABLE 19

Properties of the cured dental material

| Measurement parameter | Material |
| --- | --- |
| DOC/2 (mm) | 4.5 |
| Transmittance (%) | 37.2 |
| Transmittance (%) after the curing | 15.2 |
| Difference | 22 |
| Flexural strength (MPa) | 120 |
| Depth of cure at 80% hardness | 6.8 |
| Radiopacity (% Al) | 200 |
| CR value (24 h after polymerization) | 62 |

Example 16

Materials with $YbF_3$ with Different Particle Sizes

Three pastes with the composition indicated in Example 15 were prepared. Here, the $YbF_3$ used in Example 15 was replaced in each case by $YbF_3$ with a different particle size: Paste A: 20 nm, Paste B: 40 nm and Paste C: 60 nm. A depth of cure DOC/2 of 4.4 mm could be achieved with paste A. The coarser particles yielded a depth of cure of only 3.8 mm.

Example 17

Bis-GMA-Free Dental Material Based on the Composite Filler from Example 9 and $ZrO_2$ For the preparation of a bis-GMA-free dental material with the composition indicated in Table 20, first of all the monomers named in the table were mixed with each other and then the ytterbium trifluoride was incorporated into the monomer mixture. Thereafter, the powdered components were added and homogeneously mixed to form a paste. The material was analyzed in the manner described above. The results are indicated in Table 21.

The paste shows a very good reduction in transmittance during the polymerization and a high value for the depth of cure at 80% of the hardness. It is therefore excellently suitable as bulk-fill material.

TABLE 20

Composition of the dental material

| Component | Proportion [wt.-%] |
| --- | --- |
| V-380 | 3.5 |
| RM3 | 4.2 |
| SR 348C | 4.1 |
| TCP | 3.27 |
| V837 | 1.8 |

TABLE 20-continued

Composition of the dental material

| Component | Proportion [wt.-%] |
| --- | --- |
| $D_3MA$ | 1.5 |
| $ZrO_2$ | 1 |
| Additives | 0.07 |
| $nYbF_3$ | 7.5 |
| Accelerator | 0.04 |
| Ge photoinitiator | 0.01 |
| Camphorquinone | 0.01 |
| Composite filler from Ex. 9 | 25 |
| Glass filler 1 | 48 |
| Total | 100 |

TABLE 21

Properties of the cured dental material

| Measurement parameter | Material |
| --- | --- |
| DOC/2 (mm) | 4.3 |
| Transmittance (%) before the curing | 37.7 |
| Transmittance (%) after the curing | 14.7 |
| Difference | 23 |
| Flexural strength (MPa) | 122 |
| Depth of cure at 80% hardness | 8.0 |
| Radiopacity (% Al) | 200 |
| CR value (24 h after polymerization) | 61 |

Example 18

Dental Material Based on an Alternative Monomer Mixture

For the production of the dental material with the composition given in Table 22, first the monomers mentioned in the table were mixed together and then the ytterbium trifluoride was incorporated into the monomer mixture. Then, the powdered components were added and mixed homogeneously to form a paste. The material was analysed in the manner described above. The results are given in Table 23. The refractive index of the uncured monomer mixture was 1.508. The refractive index of the fillers was 1.50.

The paste showed a good decrease in transmission on polymerization and a very high value for depth of cure at 80% of hardness.

TABLE 22

Composition of the dental material

| Component | Proportion [wt.-%] |
| --- | --- |
| bisGMA | 6.42 |
| RM3 | 3.98 |
| $D_3MA$ | 5.33 |
| SR 348C | 1.97 |
| Chain regulator | 0.96 |
| Additives | 0.08 |
| $nYbF_3$ | 7.53 |
| Accelerator | 0.14 |
| Ge photoinitiator | 0.02 |

TABLE 22-continued

Composition of the dental material

| Component | Proportion [wt.-%] |
|---|---|
| Camphorquinone | 0.04 |
| Phosphine oxide | 0.03 |
| Composite filler from Ex. 9 | 27.50 |
| Glas filler 2 | 36.00 |
| Zirconium silicate | 10.00 |
| Total | 100 |

TABLE 23

Properties of the hardened dental material

| Measurement parameter | Material |
|---|---|
| DHT/2 (mm) | 5 |
| Transmission (%) before hardening | 33.4 |
| Transmission (%) after hardening | 15.19 |
| Difference | 18.21 |
| Flexural strength (MPa) | 104 |

Example 19

Dental Material with the Monomer MA 836

For the production of the dental material with the composition given in Table 24, first the monomers mentioned in the table were mixed together and then the ytterbium trifluoride was incorporated into the monomer mixture. Then the powdered components were added and mixed homogeneously to form a paste. The material was analysed in the manner described above. The results are given in Table 25. The refractive index of the uncured monomer mixture was 1.511. The refractive index of the fillers was 1.50.

The paste shows a very high decrease in transmission on polymerization combined with a very high value for depth of cure at 80% of hardness.

TABLE 24

Composition of the dental material

| Component | Proportion [wt.-%] |
|---|---|
| TCP | 4.13 |
| bisGMA | 4.01 |
| MA836 | 0.72 |
| RM3 | 4.01 |
| D$_3$MA | 2.89 |
| SR 348C | 1.95 |
| Chain regulator | 0.96 |
| Additives | 0.05 |
| nYbF$_3$ | 7.54 |
| Accelerator | 0.14 |
| Ge photoinitiator | 0.02 |
| Camphorquinone | 0.04 |
| Phosphine oxide | 0.03 |
| Composite filler from Ex. 9 | 27.50 |
| Glas filler 2 | 36.00 |
| Zirconium silicate | 10.00 |
| Total | 99.99 |

TABLE 25

Properties of the hardened dental material

| Measurement parameter | Material |
|---|---|
| DHT/2 (mm) | 5 |
| Transmission (%) before hardening | 46.5 |
| Transmission (%) after hardening | 14.21 |
| Difference | 32.29 |
| Flexural strength (MPa) | 104 |

The invention claimed is:

1. A dental material, characterized in that it comprises
   (a) at least one radically polymerizable monomer,
   (b) at least one radiopaque filler,
   (c) at least one inorganic filler,
   (d) at least one composite filler with spherical particles and
   (e) at least one initiator for the radical polymerization.

2. The dental material according to claim 1, which comprises as radically polymerizable monomer (a) 1,6-bis-[2-methacryloyloxyethoxycarbonylamino]-2,2,4-trimethylhexane (RM3), N-(2-methacryloyloxyethyl)carbamic acid-(2-methacryloyloxyethyl)ester (V837), tetramethyl xylylene diurethane dimethacrylate (V380), bisphenol A dimethacrylate, 2,2-bis[4-(2-hydroxy-3-methacryloyloxypropyl)phenyl]propane (bis-GMA), ethoxylated or propoxylated bisphenol A dimethacrylate, bisphenol A dimethacrylate 2-[4-(2-methacryloyloxyethoxyethoxy)phenyl]-2-[4-(2-methacryloyloxyethoxy)phenyl]propane) (SR-348c, 3 ethoxy groups), 2,2-bis[4-(2-methacryloxypropoxy)phenyl] propane, 2-{[(2-(N-methylacrylamido)-ethoxy)-carbonyl]-amino}-ethyl methacrylate (V850), bis-(3-methacryloyloxymethyl)-tricyclo-[5.2.1.0$^{2,6}$]decane (TCP), 1,10-decanediol dimethacrylate (D$_3$MA), 2-([1,1'-biphenyl]-2-oxy)ethyl methacrylate, or a mixture thereof.

3. The dental material according to claim 1, which comprises as radically polymerizable monomer (a) a mixture of
   (a-1) 20 to 80 wt.-% of at least one urethane dimethacrylate,
   (a-2) 10 to 40 wt.-% of at least one bisphenol A derivative,
   (a-3) optionally up to 40 wt.-% of at least one tricyclic dimethacrylate, and
   (a-4) optionally up to 20 wt.-% other monomers which do not fall into one of the groups (a-1) to (a-3) and (a-5),
   (a-5) optionally up to 8 wt.-% of at least one chain regulator,
   in each case based on the total mass of the component (a).

4. The dental material according to claim 3, which comprises at least one difunctional urethane of the general formula 1:
   where

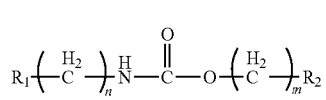

Formula 1

$R^1$, $R^2$=independently of each other in each case H$_2$C=C(—R$^3$)—C(=O)—O— or H$_2$C=C(—R$^4$)—C(=O)—NR$^5$—;
$R^3$=H or CH$_3$;
$R^4$=H or CH$_3$;
$R^5$=H or CH$_3$;

n, m=independently of each other in each case a whole number from 1 to 4.

5. The dental material according to claim 4, which comprises as component (a-1) a monomer mixture which comprises
5 to 60 wt.-% of at least one urethane dimethacrylate monomer with aromatic groups,
from 3 to 30 wt.-% of at least one difunctional urethane of Formula 1,
10 to 70 wt.-% of at least one further urethane dimethacrylate,
in each case based on the total mass of the monomer component (a).

6. The dental material according to claim 1, which comprises as radiopaque filler (b) ytterbium trifluoride with a volume-averaged particle size (D50 value) of ≤25 nm, which is measured as detailed in the description.

7. The dental material according to claim 1, which comprises as inorganic filler (c)
glass powder of from 0.1 to 5 μm and/or
one or more zirconium silicates of from 2 to 100 nm and/or
$ZrO_2$ particles of from 0.5 to 50 nm,
wherein the volume-averaged particle size is each measured as detailed in the description.

8. The dental material according to claim 1, wherein the at least one composite filler (d), comprises ytterbium trifluoride particles with a volume-averaged particle size (D50 value) of ≤25 nm, which is measured as detailed in the description, and/or spherical particles comprising zirconium silicate.

9. The dental material according to claim 1, in which the refractive index of the monomer component (a) corresponds to the refractive index of the filler (c) or is at most 0.03 greater than the refractive index of the filler (c), and/or in which the refractive index of the monomer component (a) corresponds to the refractive index of the filler (d) or is at most 0.025 greater than the refractive index of the filler (d).

10. The dental material according to claim 1, which comprises
5 to 40 wt.-% of at least one radically polymerizable monomer (a),
1 to 30 wt.-% ytterbium trifluoride particles (b),
20 to 90 wt.-% inorganic filler (c),
5 to 60 wt.-% composite filler (d) and
0.005 to 3.0 wt.-% initiator for the radical polymerization (e),
in each case based on the mass of the dental material.

11. The dental material according to claim 10, which comprises
12 to 30 wt.-% radically polymerizable monomer (a),
3 to 10 wt.-% ytterbium trifluoride particles (b) with a volume-averaged particle size (D50 value) of ≤25 nm, which is measured as detailed in the description,
45 to 65 wt.-% inorganic filler (c),
15 to 40 wt.-% composite filler (d) and
0.01 to 0.5 wt.-% initiator for the radical polymerization (e),
in each case based on the total mass of the dental material.

12. The dental material according to claim 10, which additionally comprises up to 4 wt.-% additive(s), based on the total mass of the dental material.

13. The dental material according to claim 1, which has a radiopacity of from 140% to 350% Al.

14. The dental material according to claim 1, which has a contrast value (CR value) of from 60 to 75 and a transmittance of from 8 to 25%.

15. A dental material characterized in that it comprises
(a) at least one radically polymerizable monomer,
(b) ytterbium trifluoride with a volume-averaged particle size (D50 value) of ≤25 nm, measured as detailed in the description, as a radiopaque filler,
(c) at least one inorganic filler,
(d) at least one composite filler, and
(e) at least one initiator for the radical polymerisation comprising a photoinitiator,
wherein the dental material contains a radically-polymerizable monomer (a) comprising a mixture of
(a-1) 20 to 80 wt. % of at least one urethane dimethacrylate,
(a-2) 10 to 40 wt. % of at least one bisphenol A derivative,
(a-3) optionally up to 40 wt. % of at least one tricyclic dimethacrylate,
(a-4) optionally up to 20 wt. % of other monomers which do not fall into one of the groups (a-1) to (a-3) and (a-5), and
(a-5) optionally up to 8 wt. % of at least one chain regulator, in each case based on the total mass of component (a),
wherein the refractive index of the monomer component (a) is equal to or at most 0.03 greater than the refractive index of the filler (c), and wherein the refractive index of the monomer component (a) is equal to or at most 0.025 greater than the refractive index of the filler (d).

16. The dental material according to claim 1, for therapeutic application as dental cement, coating, veneering material, filling composite, or bulk-fill composite.

17. A method of using the dental material according to claim 1 for non-therapeutic use comprising
producing of inlays, onlays, crowns and bridges using the dental material.

18. The dental material according to claim 1, wherein the at least one initiator for the radical polymerization comprises a photoinitiator.

* * * * *